INVENTOR.
GEORGE R. GAMERTSFELDER

United States Patent Office 3,485,560
Patented Dec. 23, 1969

3,485,560
AZIMUTH ALIGNMENT SYSTEM
George R. Gamertsfelder, Pleasantville, N.Y., assignor to Singer-General Precision, Inc., a corporation of Delaware
Filed Nov. 1, 1965, Ser. No. 505,797
Int. Cl. G01b 1/00; G01c 21/06
U.S. Cl. 356—151
8 Claims

ABSTRACT OF THE DISCLOSURE

A pattern of parallel bars preoriented in azimuth is placed on the ground. The adjacent bars have opposite light reflecting characteristics (white and black, for example). A lens system produces an image of part of the pattern and positions the image on a focal plane. An endless film strip or loop having a plurality of grating apertures formed by transparent and opaque slits in positioned with one part of the loop substantially in the focal plane. Adjacent gratings are equally but oppositely offset from a perpendicular line. The film loop is revolved. A photodetector using optical correlation principles detects the intensity of light passing through each grating and when the light passing through adjacent gratings is equal, the perpendicular will be lined up in azimuth with the parallel bars. The azimuth of the perpendicular is duplicated by a coupled indicator.

---

This present invention relates to an azimuth orientation system employing the principles of optical correlation. In particular the present invention is a novel azimuth alignment system which automatically aligns a direction indicating device, such as a compass, with a preselected geographically oriented object or pattern.

From one aspect the present invention relates to a system for accurately aligning, calibrating or adjusting a direction indicating device such as a directional gyro, a gyro compass or other compass system with a known direction as indicated by a geographically, physically oriented, remote object, such as a pattern of substantially parallel bars oriented in a preselected geographical direction.

From another aspect the present invention relates to a system employing optical coupling between two remotely located patterns in which one pattern is preoriented geographically so as to define an azimuth and the azimuth so defined is essentially transferred optically so that another pattern may be compared with the preoriented pattern and repositioned, if necessary, so that azimuth of the preoriented pattern may define the position of the second pattern upon optically correlating the first and second patterns.

As a compass azimuth or heading alignment system the present device may be employed as an instrument for rapidly, precisely aligning a compass or compass system with an accurately predetermined geographically positioned object just prior to take-off of an aircraft or other vehicle. For an aircraft, a last minute alignment and check or a compass may be performed just prior to entering the runway for take-off, such as during the pretake-off check.

One advantage of the present alignment system is that azimuth alignment may be accomplished with the vehicle in full operation, i.e., all electrical apparatus running.

Another use of the present device will be found in swinging a compass. The cardinal direction readings of a compass may be calibrated by use of the subject instrument by performing similar functions but with different standards or procedures. A magnetic compass may be swung without accurately heading the aircraft so as to exactly line up in the cardinal directions of a compass rose.

The last minute check for compass alignment, prior to take-off, may mean the difference between safe completion of a mission or failure of the mission. Calibrating the compass without the need of aligning the aircraft with the cardinal headings of a compass rose may reduce the time and man-hours normally needed for completion of such a job. Another advantage of the present invention is that alignment of the axis of the vehicle by eye or human judgment has been eliminated. In addition, the reference pattern employed is so close to the vehicle that alignment interference due to fog, rain, snow and/or generally bad weather conditions has been substantially eliminated.

It is an object of the present invention to provide an azimuth orientation system for a direction indicating device or system employing optical correlation.

Another object is to provide an azimuth alignment system which automatically aligns a direction indicating device with a remote object having a preselected oriented azimuth.

Another object is to provide an azimuth alignment system which images a remote object having a preselected azimuth and matches a local direction indicating device in azimuth with the remote object via correlation with the transferred image of the remote object.

Another object is to provide an optical correlation azimuth alignment system in which a remote pattern having a preoriented azimuth is imaged and essentially transferred to a local position and a local direction indicating device is aligned in azimuth with the local image through optical correlation.

These and other objects will become more apparent from reading the following detailed description with reference to the accompanying drawings in which.

Figure 1:
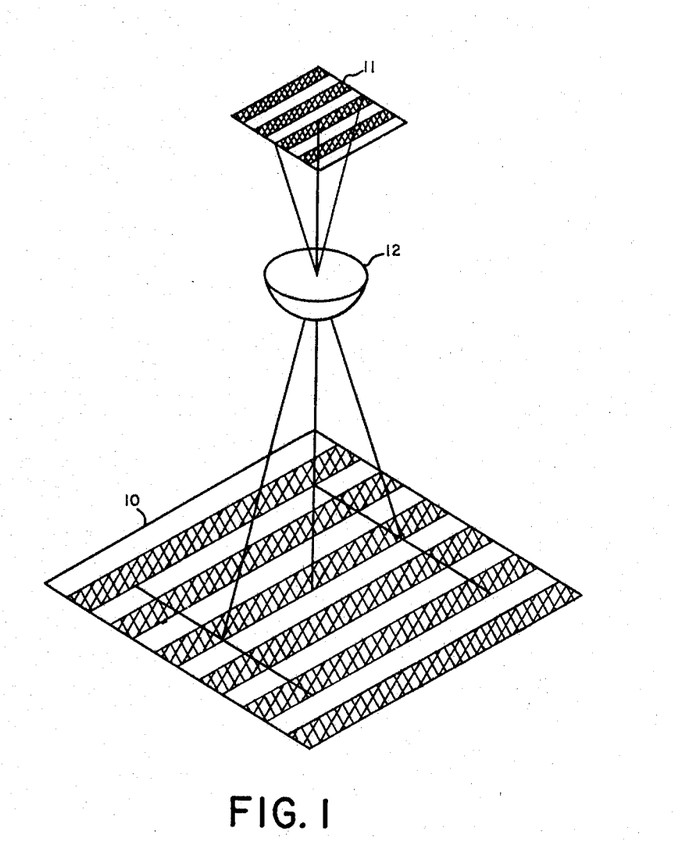
FIG. 1 is a diagrammatic illustration of the optical system for imaging the pattern.

Referring to FIG. 1 a pattern 10 of parallel alternate black and white bars is represented and is assumed to be on the ground. This pattern may, for example, be painted or marked on the surface or ground covering such as concrete or cement, for example, for permanent positioning or may be marked on a mat, rug, sheet or other means which may support such a pattern which may be layed down temporarily.

Figure 2:
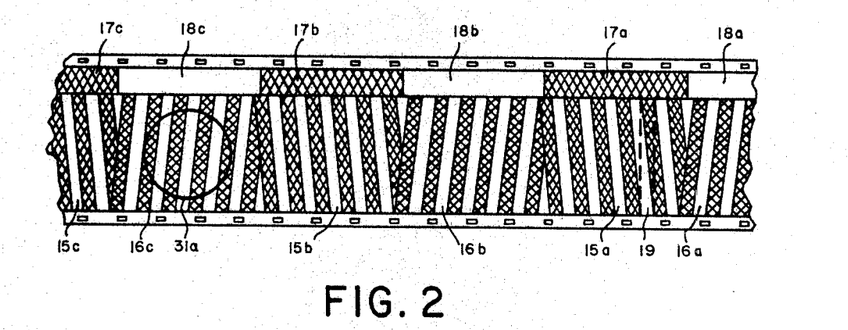
FIG. 2 is a graphic illustration of a piece of film having alternate patterns of offset gratings each of which are correspondingly coded.

The bars or strips are preferably of uniform and equal width and are sufficiently wide so that an image, such as 11 may be formed by a lens, such as 12, in which the bars or strips of the image may be the same width as the strips in the gratings as shown on the film seen in FIG. 2. The width of the bars of the image may be controlled somewhat by the type of lens used to develop the image.

Figure 6:
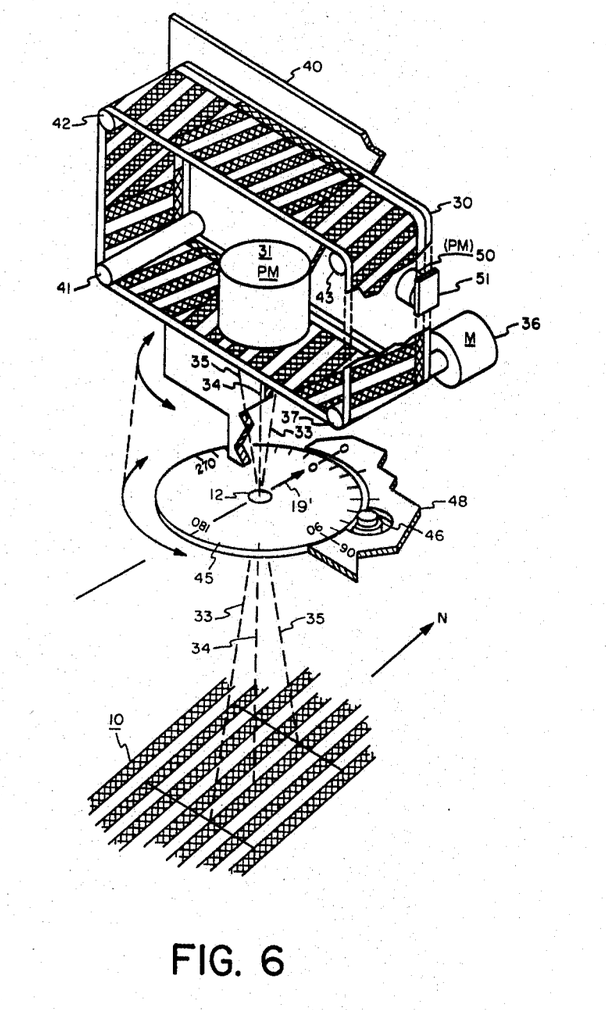
FIG. 6 is a graphic illustration of a preferred embodiment of the azimuth alignment device.

As will be made clear when FIG. 6 is viewed, the image 11 of the pattern 10 is projected by the lens 12 so that the gratings on the film, seen in FIGS. 2 and 6 particularly, may be optically correlated with the image so projected.

The bars in the pattern 10 of FIGS. 1 and 6 are oriented geographically so that the bars lie in a predetermined direction such as true north and south, for example. The bars may be oriented by use of a declinometer, for example. On a permanent installation it is necessary to align the pattern only once, i.e., when the pattern is layed down.

The lens 12 serves to project an image of the pattern so that the azimuth of the bars of the image is exactly the same as the azimuth of the bars of the pattern.

Thus, the azimuth indication of the ground pattern has been optically transferred to a remote position where, essentially, the azimuth of the ground pattern may be employed as a reference.

FIG. 2 shows in detail the alternately angled gratings of a portion of film which is preferably in the form of an endless loop film, as shown more fully in FIG. 6.

It will be seen that the stripes of the gratings 15a, 15b and 15c are angled in the same direction and are all offset from normal by the same amount. The strips of the gratings 16a, 16b and 16c are each offset in a direction from normal which is opposite to the alternately interposed gratings. Notice that in grating 15a the normal is represented as broken line bar, 19.

Each grating is identified by what may be referred to as a keying strip. The gratings 15 are identified by an opaque section such as 17a, 17b and 17c and the gratings 16 are identified by a transparent section 18a, 18b and 18c. The gratings offset in one direction each have one same identification and the gratings offset in the other direction each have another, different, same identification.

It should be noted that throughout the several drawings a black bar, strip or stripe and an opaque bar is represented by cross-hatching. Thus, for example, the identifying or keying sections 17a, 17b and 17c would be black or opaque and the cross-hatched stripes in the gratings would be black or opaque. The cross-hatched bars in the pattern 10, for example, would be black or some other color which would not reflect light. A white bar, strip or stripe and a transparent bar or stripe is represented as unhatched or clear. An example of a representation of a transparent stripe would be the identifying or keying section 18a, 18b and 18c. The unhatched or clear bars in the pattern 10 may be white or silver or some color that reflects light.

Figure 8:
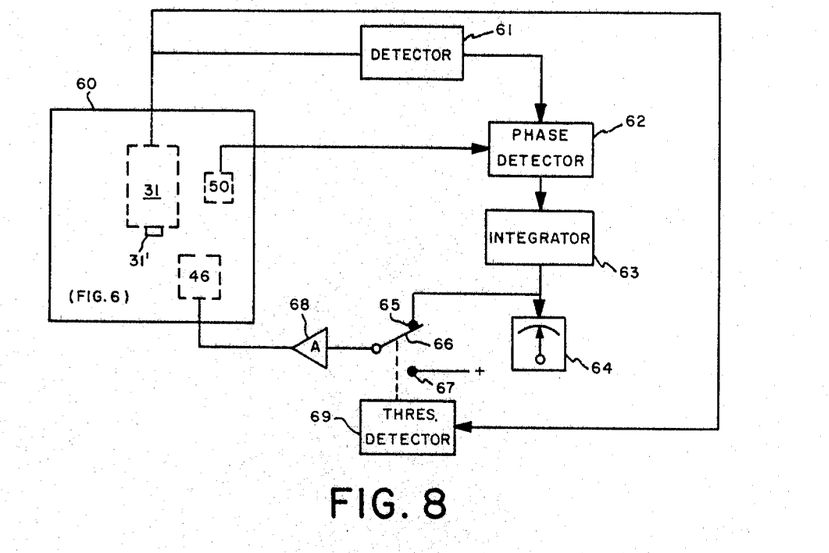
FIG. 8 is a block diagram of a simplified arrangement of an automatic azimuth alignment system.

The circle 31a in the grating 16c may represent the area "seen" by the aperture of the photodetector 31. The photodetector 31 is seen in FIG. 6 and the aperture 31' is represented in FIG. 8. It will be further understood that if the circle 31a represents the area "seen" by the aperture of the photodetector, then the image 11 of the ground patern 10 would be projected so as to at least cover the entire area of the circle 31a.

Figure 3:
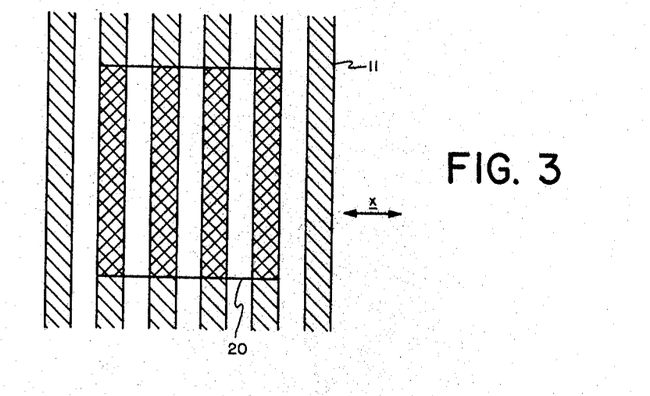
FIGS. 3, 4 and 5 are illustrations of various possible displacements of the imaged pattern relative to the grating.
Figure 4:
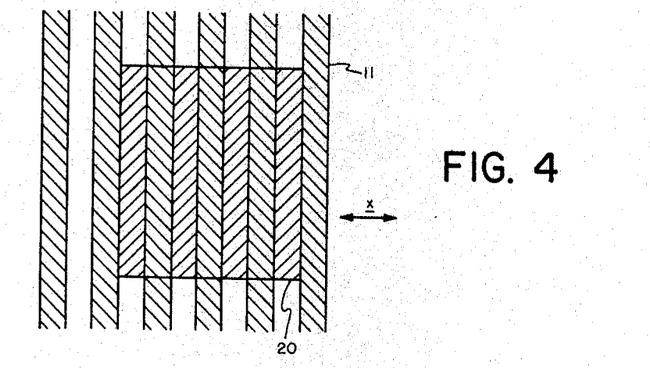
Figure 5:
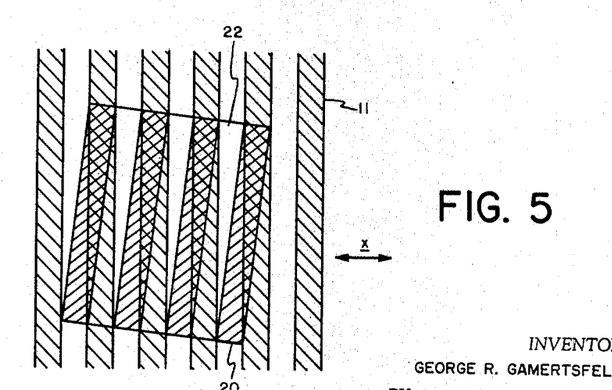

FIGS. 3, 4 and 5 are presented so as to more completely explain how the grating and the image may be correlated. In each of FIGS. 3, 4 and 5 an image of a ground pattern is represented as 11. The black bars (hatched) and the white bars (unhatched) of the image of the pattern are shown as being substantially the same width as the opaque (hatched) and transparent (unhatched) slits of the grating. This may be accomplished by the lens 12 which forms and projects the image. It will be appreciated that in FIGS. 3, 4 and 5 the film, labeled 20, is, for convenience, shown as a grating pattern rather than in the more complete form shown in FIG. 2.

In FIG. 3 it will be seen that the bars of the image 11 and the slits of the grating 20 are exactly lined up and the black bars of the image and the opaque slits of the grating lie in exact coincidence. It will be noticed that under such conditions the amount or intensity of light reflected from the white bars and passing through the transparent slits will be maximum.

Consider FIG. 4, although the bars of the image 11 are exactly lined up with the slits of the grating 20, the opaque slits of the grating lie in exact coincidence with the white bars of the image. Under these circumstances the light reflected from the white bars is blocked from passing through the grating so that the amount or intensity of light passing through the grating will be at maximum intensity.

Consider now that the grating 20 of FIG. 3 was moved along the $x$ direction (in the direction of the arrow $x$). As the grating is moved, the bars of the image and slits of the grating may remain aligned (parallel) but as the opaque slits move into and over the white bar areas, the light passing through the network will progressively reduce in intensity until the condition as shown in FIG. 4 is reached and the light intensity will be reduced to substantially zero. Thus the amount or intensity of light depends upon the $x$ position of the grating with respect to the image when the image and grating are parallel.

Consider now FIG. 5. The bars of the image 11 and the slits of the grating 20 are out of alignment (not parallel). In this figure the slits of the grating are shown offset from the normal and have an appearance closer to the offset grating 16 shown in FIG. 2. Obviously since some of the black or opaque area of the image 11 and the transparent area of the grating overlap the maximum amount of light passed through this network will not be as much as the maximum light intensity obtained in FIG. 3, for example. However, when the grating is moved in the $x$ direction it becomes obvious that the condition represented in FIG. 4 will also not be reached so that the minimum amount of light passed through this network will exceed zero. Experimentation has shown that with a pattern image and grating aligned as shown in FIG. 3 the grating, for example, may be rotated with respect to the bars of the image (pattern) the amount of light passed will decrease in intensity uniformly from maximum intensity until passage of the minimum intensity of light for a misaligned grating is reached. As pointed out above the minimum intensity for a grating is above zero.

Further, it has been observed that light passage intensity will decrease from maximum intensity uniformly, with rotation of the grating with respect to the image, up to an angle of $d/l$ (radian) where $d$ is the width of the slits in the grating and $l$ the length. At this point light passes through the triangular shape area where the transparent part of the grating and the white part of the image are in coincidence, as shown in FIG. 5. It will further be observed that regardless of the $x$ position of the grating the triangular shaped areas of coincidence, such as 22, are always present although these may shift as the grating moves in the $x$ plane. This coincident area may be reduced so as to comprise approximately ¼ of the total area of the grating as opposed to a coincident area of approximately ½ of the total area of the grating when the image and grating are aligned in parallel and coincidence such as presented in FIG. 3. It has also been found that for angles greater than $d/l$, the fractional transmitting or coincidence area remains at ¼ of the total area of the grating. Thus the amount or intensity of light passed through ¼ of the total area of the grating then becomes the minimum intensity.

It has also been observed that when the slits of a grating are not parallel to the bars of the image but are offset at an angle less than $d/l$ and the slits are moved so as to traverse the bars, the light intensity passed varies with the position of the slits in a manner similar when the slits are parallel to the bars and the grating traverses the bars. However, as the angular offset increases toward $d/l$ the differential between maximum and minimum light intensity obtained during a traversing movement decreases until at an angular offset of $d/l$ or more, the intensity of light passed remains substantially constant when the slits traverse the bars. When the stripes of the grating are offset at an angle of $d/l$ or greater, regardless of the direction of offset, the amount of light intensity passed remains constant and no longer depends upon the $x$ position of the grating or the angular offset position of the slits of the grating.

Returning to FIG. 2, it will be seen that a sequence of alternately angled gratings may be provided in which adjacent gratings are equally and oppositely offset from normal. In the preferred arrangement the gratings such as 15a, 15b, 15c are offset in one direction, for example counterclockwise, just less than the angle $d/l$. The gratings such as 16a, 16b, 16c are equally offset in the other direction, for example clockwise, just less than the angle $d/l$. Although the slits of adjacent gratings are oppositely offset, the amount or angle at which the slits are offset from normal are equal. It then follows that if the film strip is substituted for the gratings 20 and the normal (slit 19) is aligned with the bars of the image 11, then the slits of adjacent grating would be equally (and oppositely) offset from the bars of the image and would each pass a varying intensity of light having the same maximum and minimum values.

By employing instrumentation such as illustrated in FIG. 6 a film 30, in an endless belt form, may be used on which has been made a series of alternately offset gratings (at equal angles). The light intensity passing from the white bars of the image 11 through the transparent slits of the gratings may be detected by use of a photodetector or photomultiplier 31. The light passing through the image-grating network may be expressed as an electric value, which is proportional to the intensity of light passing through the network. When the light intensities vary as the slits traverse the image of the bars the output of the photodetector will be a varying or alternating current. When the intensities remain substantially constant the output will be a substantially constant or direct current.

By moving (revolving) the film the slits of the gratings will move in the $x$ direction relative to the image, or traverse the image of the bars. An area over the network may be selected and a photodetector may be mounted so that the photodetector will detect light passing through the area of the network. As the film is moved past the aperture of the photodetector the light intensities passed to the photodetector will change as the slits traverse the bars of the image, so long as the angular offset of the slits is less than $d/l$. When the angular offset of the slits is at or more than $d/l$ then the intensity of light passing through adjacent slits remains substantially constant as the slits traverse the bars of the image.

The light intensities passed to the photodetector 31 will be expressed as an electric output. As will be more fully described below, when the light intensity passing the slits of a grating changes as the slits traverse the bars, the output of the photodetector will be an alternating current AC corresponding to such change. The envelope of the AC output is sensed by the system as represented in FIG. 7.

Figure 7:
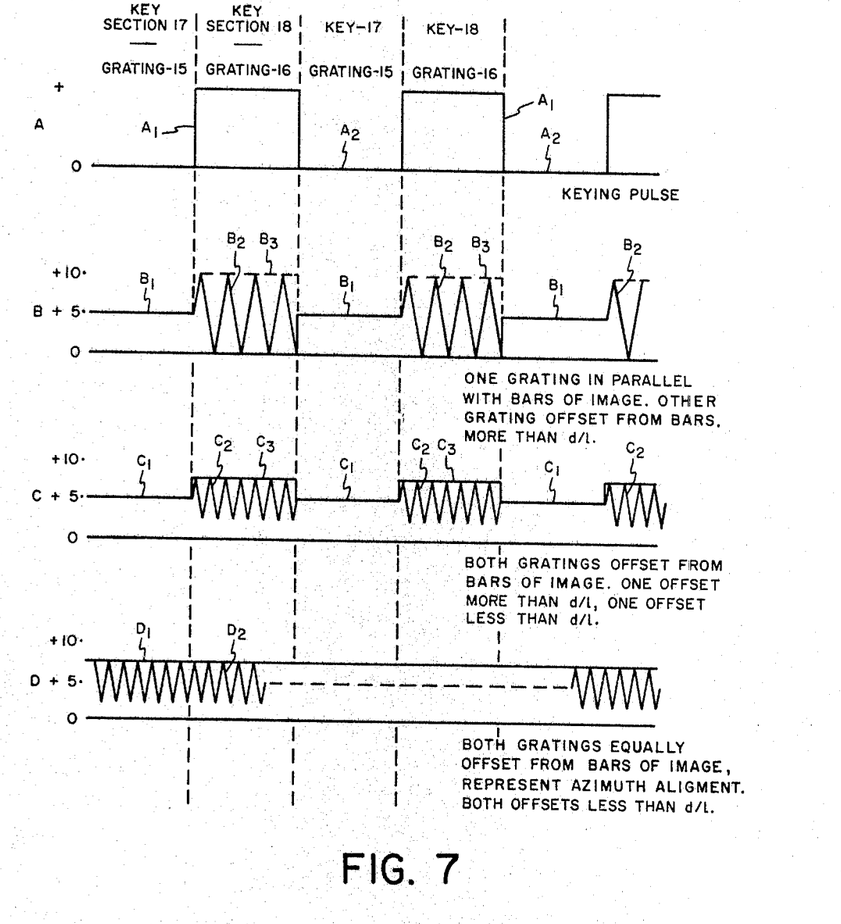
FIG. 7 is a series of waveforms helpful in understanding the invention.

As seen in FIG. 7, at B, the waves $B_1$ represent that the slits of the grating are offset more than $d/l$ with respect to the image of the bars. The waves $B_2$ represent that the slits of the grating are in parallel with the image of the bars. The envelope is shown in broken line form. In waveforms C the waves $C_1$ represent that the slits are offset more than $d/l$ with respect to the bars of the image but the waveforms $C_2$ are offset less than $d/l$. Thus in waveforms $C_2$ the AC wave is shown but the square wave form is the envelope of the AC waves. In waveform D the slits of adjacent gratings are offset equally (and oppositely) and are both offset less than $d/l$. The line $D_1$ represents the envelope of the AC wave $D_2$.

If the slits of adjacent gratings are equally (and oppositely) inclined relative to the bars of the image (this output represented by wave D) then the normal (broken slit 19 in FIG. 2) is parallel to the bars of the ground pattern and image and the normal 19 (also arrow 19' in FIG. 6) now represents the azimuth of the ground pattern. The equally and oppositely inclined condition may be obtained by rotating the film with respect to the bars of the image.

FIG. 6 shows apparatus for accomplishing alignment with the azimuth of a preset pattern.

The pattern of parallel bars 10 is represented as pre-oriented geographically, for example, north and south. The pattern 10 is either marked or layed on the ground. The remaining apparatus is in the vehicle which has the direction indicator to be aligned.

Assuming the vehicle is an aircraft, the aircraft is taxied to a position so that the lens 12 is over a portion of the ground pattern 10. The lens 12, which is part of the equipment located in the aircraft, "sees" part of the ground pattern and images that part of the pattern, projecting such image to a location convenient for making comparison or correlation with the gratings on the film strip or loop 30. The image of the ground pattern may be projected onto a transparent plate or directly onto the film strip. Projection of the image of the pattern is represented by the lines 33, 34 and 35. The line 34 also represents an axis around which the entire apparatus is pivoted or rotated. In the present arrangement the entire apparatus in the aircraft is mounted for rotating or pivoting about an axis such as 34. This provides for rotating the belt 30 with respect to the image and thus rotating the normal, represented by 19' with respect to the ground pattern all while the aircraft remains stationary.

A film 30 is shown in an endless belt form on which the oppositely inclined gratings are provided as opaque and transparent strips. A motor, M, 36 is employed to drive or revolve the film by means of a shaft 37. The motor may be mounted on a mounting plate 40. Since the film has sprocket holes around the perimeter of the loop, a drive sprocket (not shown) may be used to provide more positive control over the loop of film when it is being driven.

The shafts 41, 42 and 43 may be guide shafts and are also mounted on the plate 40 and hold the film strip in a particular shape. In the preferred arrangement the lower part of the loop is substantially flat so that the image of the ground pattern may be projected onto the underside of the film strip, if desired. Although the film loop is shown in a rectangular configuration, the arrangement is not limited thereto. On the interior of the loop, positioned above the area where the image of the parallel bar pattern is projected, is a photodetector or photomultiplier 31 (PM). The aperture of the photodetector is positioned so that the light from the white bars of the image passing through the transparent slit of the grating may be sensed by the photodetector. Thus the photodetector 31 may be actuated by the light and may provide an electric output which corresponds to the light intensity characteristics passing through the portions of the transparent slits of the grating which are coincident with the white slits of the image.

The photodetector 31 is mounted so as to be directly above the lens 12 and may be positioned so as to be centered substantially on the axis. The film loop is mounted so that the width of that portion of the film loop having the gratings is essentially centrally positioned on the axis of the apparatus, which may be considered to be in exact coincidence with the line 34. The mounting plate 40 is itself mounted on a rotatable disc 45 which rotates about the axis. The rotatable disc 45 has placed thereon an arrow 19' and bearing markings on both sides of the arrow. The disc 45 is rotated about the axis by a motor 46 thus rotating the entire assembly. By the "entire assembly" is meant to include the mounting plate 40, the tape 30, the photodetector 31, the motor 36, the retaining pins 41, 42 and 43, the drive pin 37, the photodetector 50, the light source 51 and the disc 45. The motor 46 may be a reversible motor so that the assembly may be driven in either direction. The arrow 19' is assumed to be in exact coincidence with the normal 19 (FIG. 2) across the width of the film strip, at all times. Thus when the normal 19 is aligned in azimuth with the ground pattern, the arrow 19' is also aligned and indicates the azimuth.

Also on the film loop are the identifying or keying strips which are more clearly shown in the portion of the film in FIG. 2.

The grating identification or grating key signal is provide by use of a photodetector or photomultiplier, such as 50 which "looks at" light source 51 through the identifying or keying strip. The position of the photodetector 50 corresponds to the position of the photodetector 31 as far as the identification strip is concerned.

It will be obvious that the disc 45 and the apparatus mounted thereon may be rotated or pivoted about the axis (which is in coincidence with line 34). By rotating the apparatus, the slits of the grating on the film loop 30 are angularly reoriented with respect to the bars of the image of the pattern. Thus the apparatus may be rotated so that the slits of the oppositely inclined gratings on the film are equally and oppositely angularly offset from the bars of the image of the pattern. This essentially aligns the normal (19 of FIG. 2) to the film with the bars of the image. The azimuth of the normal 19 is indicated by the arrow 19', both 19 and 19' being in the same azimuth at all times.

The section 48 represents part of the bed or chassis of the aircraft or vehicle in which the azimuth alignment system is mounted. On this section (48) may be placed a reference to the longitudinal axis of the vehicle, for example. The heading of the vehicle may thus be obtained by comparing the longitudinal axis reference 48 with the rotatable disc 45 once the azimuth alignment is obtained. The arrow 19' on the disc 45 may serve as an azimuth indication and the heading of the vehicle may be determined.

Obviously linkage from the rotatable disc 45 or from some other part so rotated may be provided so that the precise heading of the vehicle may be remotely indicated. The direction indicating device, for example the compass, may then be adjusted according to the precise heading of the vehicle, or the compass may be read and the deviation of the compass may be noted on a compass calibration chart. (Where a magnetic compass is concerned it is assumed that the variation is already known.)

Linkage may also be provided to duplicate the position indicated by the rotatable disc 45 on another disc remotely located from the apparatus shown in FIG. 6.

It will be obvious from the apparatus and system described herein that the rotatable disc 45 may be aligned 180° out of alignment. In general, prior knowledge will establish the azimuth orientation to better than ±90°. Thus the 180° ambiguity of the instrument is not serious.

Referring now to FIG. 7 a series of waves are represented where the wave A represents the output of the photodetector 50 when the film loop is driven or revolved by the motor 36 and the keying sections pass by the aperture of the photodetector 50. When an opaque section blocks out the light source 51 from the photodetector 50, the output is represented as essentially zero. When a transparent section permits passage of the light source to the photodetector 50 the output goes to maximum. Thus the wave A is represented as a series of square voltage waves separated by zero voltage outputs. This is represented as the Keying Pulse. Obviously the keying pulse rate is determined by the speed at which the film is driven.

Wave B represents that the slits of one grating are exactly parallel with the image bars. When the opaque slits of the grating coincide with the black bars of the image (see FIG. 3) the light passed will be at maximum intensity and the output of the photodetector will be maximum. As the film loop continues to revolve (slits traverse the bars) the opaque slits of the grating start to cover the white bars thus reducing the light intensity passing through the grating. The amplitude of the output of the photodetector 31, correspondingly decreases reaching a minimum (zero) when the opaque slits of the grating are in coincidence with the white bars of the image (see FIG. 4). This provides an AC represented by $B_2$ with the greatest amplitude (and lowest amplitude) so that an envelope, represented by broken line $B_3$ of the wave will be of the highest amplitude. As the film loop continues to advance, the oppositely inclined grating (the adjacent grating) then starts to pass or traverse before the aperture of photodetector 31. The slits of this grating are not parallel with the bars of the image (see FIG. 5) and would in fact be offset more than $d/l$ thus providing a relatively constant light intensity to the photodetector. The output of the photodetector 31 would thus be a constant signal which is at least one-half the value of the maximum signal. This signal is represented as wave $B_1$ in FIG. 7.

By rotating the apparatus, the grating that was previously parallel with the bars of the image becomes misaligned and the previously misaligned grating becomes less misaligned.

Wave C represents this latter condition. In this instance the slits of adjacent gratings are misaligned with the bars of the image and the misalignments are unequal so that the slits of one grating are misaligned less than $d/l$, $C_2$ and the slits of the other grating are misaligned more than $d/l$, $C_1$. The envelope $C_3$ of the AC wave $C_2$ of the output of the photodetector 31 will be a modulated square wave signal where the greater amplitude will represent the light intensity passed by the grating most closely aligned in parallel with the bars of the image. Wave C shows the portions $C_1$ which represent outputs corresponding to substantially constant light intensity passage and portions $C_2$ represent varying light intensity passage.

Note that the keying pulse (wave A) may be used to determine which grating is most closely aligned with the bars of the image and therefore which way the apparatus is to be rotated in order to obtain equal and opposite offset or inclination of the slits of the gratings, relative to the bars of the image.

Wave D represents the envelope ($D_1$) of the AC signal output ($D_2$) of the photodetector 31 when the apparatus has been positioned so that the slits of the adjacent gratings are equally and (and oppositely) offset from the bars of the image of the ground pattern. The light passage by adjacent gratings will be varied so as to produce the AC wave $D_2$ but the variation will be constant from grating to grating and the envelope $D_1$ will be substantially constant. Since the gratings are assumed to be of the arrangement shown in FIG. 2, that is, equally and oppositely offset or inclined from normal (19), then it can be assumer that the normal or perpendicular 19 is in exact alignment with the bars of the image or the bars of the ground pattern. Since the perpendicular (19), is assumed to be in exact alignment with the arrow 19' on the disc 45, then the arrow 19' may be assumed to be aligned in azimuth with the bars of the ground pattern and may serve as a local indication of the azimuth indication of the remote ground pattern 10.

FIG. 8 represents, in block diagram form, a search system for automatically driving the apparatus of FIG. 6 to a condition where the arrow 19' is aligned in azimuth with the azimuth of the ground pattern.

The block 60 represents apparatus such as illustrated in FIG. 6 with the broken line block 31 representing photodetector 31, the broken line block 50 representing photodetector 50 and the broken line block 46 representing the motor 46.

The output of the photodetector 31 is applied to detector 61, which may essentially detect and pass a signal representing the envelope of the AC generated by the photodetector. The output of the detector 61 may be a signal having a waveform substantially as represented at B ($B_1$ and $B_3$), C ($C_1$ and $C_3$) and/or D ($D_1$) in FIG. 7.

The output of the photodetector 50 which may be a waveform substantially as represented at A in FIG. 7, is applied to a phase detector 62 which also receives the output of the detector 61. The phase detector 62 may be in the form of a coincidence gate or other logic circuit which provides a selected output for driving the motor 46 either clockwise or counterclockwise.

As seen in FIG. 7 at A, the keying pulse may be either positive or at zero potential and, as seen at C when the slits of adjacent gratings are at unequal offsets from the bars of the image, the signal corresponding to that grating more closely parallel to the bars of the image is greater in amplitude. The keying pulse may be used to determine the direction of rotation for obtaining equal offset, as seen at D in FIG. 7.

Thus, the phase detector 62 may include circuitry for providing a positive direct current DC signal, for example, which drives the motor 46 in a clockwise direction when the signal output of the photodetector 31 is greater in amplitude during the more positive portion ($A_1$) of the key pulse (see waves A and C in FIG. 7) and provides a negative DC signal, for example, which drives the motor 46 in a counterclockwise direction when the signal output of the photodetector 31 is greater in amplitude during the more negative portion $A_2$ of the key pulse.

The output of the phase detector is applied to an integrator circuit 63 which provides a substantially constant amplitude DC signal which may be either positive or negative. The output of the integrator is applied to an indicator 64 which may indicate which direction the motor is rotating the azimuth alignment apparatus.

The output of the integrator is also applied to the terminal 65.

A switch contact 66, when positioned to contact terminal 65, completes a circuit through an amplifier 68 to supply power to operate the motor 46.

The AC output of the photodetector 31 is also applied to a threshold detector 69 which serves to control the position of switch contact 66. The threshold detector 69 may be a circuit which, when there is an AC the output from the photodetector 31, such as represented by wave $C_2$ in FIG. 7, the switch contact 66 (controlled by threshold detector 69) is positioned so as to connect with terminal 65. When the AC output of the photodetector 31 is substantially zero, such as would occur when the slits of adjacent gratings are both offset at or more than $d/l$ (such as represented at $B_1$ and $C_1$), the switch contact 66 is positioned to the terminal 67, which is essentially an automatic search terminal. Terminal 67 is connected to a power source which drives the motor 46 in one direction until an AC appears at threshold detector 69. At such time the system becomes self-seeking.

It should be understood that the azimuth alignment system as represented in FIG. 8 has been simplified. The detector, phase detector circuit, integrator circuit and threshold detector circuit may be circuits or components which are well known. The photodetector or photomultiplier are also well known in the art and the motor (RM) is preferably a reversible motor which may run in one direction in response to a positive DC and run in the reverse direction in response to a negative DC. The direction in which the apparatus would be driven would be in such direction so as to increase the angular offset of the grating most nearly parallel with the bars of the image.

Although the use of the presented apparatus and system has been limited to ground positioned vehicles, i.e., aircraft on the ground and surface traveling vehicles, the present system may be used by aircraft which are airborne. Because the system is self-seeking, the azimuth alignment system may serve to provide a precise azimuth alignment or precise heading relative to a known geographical position. If the object used for transfer of azimuth is a parallel bar pattern, as described herein, the lens, such as 12 in FIGS. 1 and 6 may require some focusing or adjustment so as to obtain the desired size image of the parallel pattern at the desired place. This may be accomplished with a "zoom" lens, for example.

The height above the ground at which such azimuth alignment system may function depends upon the size of the parallel bar pattern and the ability or characteristics of the lens to form the image necessary for cooperating in the correlation function.

The advantage of a parallel bar pattern is that alignment with the azimuth of the bars in the pattern may be done without regard to exact location or positioning over the pattern.

Thus I have described the preferred form of apparatus embracing my invention and I have shown and described the block diagram of a simplified system for automatically aligning the apparatus with a remote azimuth indicating pattern the preferred form of pattern and apparatus has been shown and described and a simplified automatic search system has been represented and described. Other forms of the present invention may be made by rearrangement and/or substitution of parts, as will be familiar to those skilled in the art, without departing from the spirit of the invention as defined in the appended claims.

What is claimed is:

1. A system for aligning a direction indicating device with a known azimuth including;
    a remotely located pattern of parallel bars of substantially equal width and preoriented in a known azimuth,
    adjacent bars of said pattern having opposite light reflecting characteristics,
    an endless belt having a series of oppositely inclined gratings thereon, each grating including,
    a plurality of alternately positioned transparent and opaque parallel slits of substantially equal width,
    means for projecting an image of a portion of said pattern on a portion of said endless belt,
    means for revolving said belt so that successive gratings pass the said image,
    a photodetector for detecting the intensity of light from the light reflecting bars of said image passing through the transparent slits of said gratings and for providing an electric signal proportional in amplitude to the intensity of the light so passed,
    means for rotating said belt about an axis normal to said image for adjusting the angle of the slits of adjacent gratings to a position where the slits of adjacent gratings are equally and oppositely inclined with respect to the bars of said image, and
    indicating means coupled to said belt for indicating the azimuth of said belt when the slits of adjacent gratings are equally and oppositely inclined with respect to the bars of said image.

2. A system for aligning a direction indicating device with a known azimuth as set forth in claim 1 including;
    means for generating a keying signal having a fixed phase relation with respect to said gratings, and
    means for orienting said endless belt in azimuthal position in accordance with the phase comparison of the said keying signal and said electric signal.

3. An azimuthal alignment system including;
    means indicating a predetermined azimuth,
    said indicating means including a plurality of parallel bars having substantially equal width with alternate bars of said plurality having opposite light reflecting characteristics, said indicating means positioned substantially on the ground,
    means positioned above said indicating means for imaging a part of said indicating means and for focusing said image on a focal plane,
    an endless film strip having a plurality of transparent and opaque slits across its width forming a plurality of gratings, each alternate grating being substantially identical to each other and the slits of adjacent gratings being equally and oppositely angularly offset from a line perpendicular to the width of said film strip
    means for revolving said film strip so that successive gratings pass the image in said focal plane,
    said film strip forming an endless loop one side of which is substantially positioned on said focal plane, a photodetector positioned for viewing a part of said image through part of said film strip and for providing an electric value proportional to the intensity of light reflected from the bars so reflecting light and passing through the transparent slits of the gratings of said film strip means for indicating the direction of said perpendicular, and means responsive to said electric value for indicating when said slits of adjacent gratings are passing substantially equal amounts of light.

4. A system for aligning the azimuth of a direction indication device with a predetermined azimuth including;

a ground pattern of a plurality of parallel bars with adjacent bars having opposite light reflecting characteristics and said bars of said pattern positioned in a predetermined azimuth, means for imaging said ground pattern, in exact azimuth, on a focal plane, an endless film strip having alternately positioned adjacent gratings, thereon, each grating including a plurality of parallel opaque and transparent strips, alternately positioned and forming said grating, with adjacent gratings oppositely and equally angularly offset from a line forming a perpendicular across said film strip, said endless film strip forming a loop with one side of said loop substantially in coincidence with said focal plane, a photodetector responsive to light and having an aperture positioned for viewing said image through said film strip at said focal plane, means for revolving said film strip for moving successive gratings past said aperture so as to vary the intensity of light passing through said transparent slits of said gratings according to the angular offsets of said slits with respect to the bars of said image, means for rotating said film strip about an axis normal to said focal plane so that the slits of the adjacent gratings are oppositely and equally offset from the bars of said image, means for indicating when the intensity of light passed through adjacent gratings is equal, and means for indicating the azimuth of the said perpendicular across said film strip.

5. A system for aligning a direction indicating device with a known predetermined azimuth comprising, a pattern surface composed of parallel bars of alternate opposite light reflecting properties fixedly positioned with the parallel bars extending in a preselected azimuthal direction, an endless film strip having a pattern of alternate light transmitting and light inhibiting parallel bars positioned thereon, means for projecting an image of said pattern surface onto said film strip, means for revolving said film strip about an axis parallel to the plane of the image of said pattern surface, means for rotating said film strip about an axis normal to the plane of the image of said pattern surface, means for measuring the amount of light transmitted through said film strip, and means controlled by the light transmitted by said film strip for positioning said film strip so that the film strip and a coupled direction indicating means are oriented in the same fixed azimuthal direction normal to said axis as the parallel bars of the pattern surface.

6. A system for aligning a direction indicating device with a known predetermined azimuth comprising, a pattern surface composed of parallel light and dark bars fixedly positioned with the parallel bars extending in a predetermined selected azimuthal direction, a film strip composed of alternate light transmitting and light inhibiting lines, an optical system projecting light reflected from said pattern surface on said film strip, a photodetector positioned to receive light after passage through said film strip, means for continuously moving said film strip relative to the photodetector in a direction transverse to the film strip lines, and motor means controlled by the output of the photodetector, pivoting the film strip about an axis normal to the plane of the portion of the film strip through which the reflected light passes to a position in which the photodetector produces a predetermined signal indicative of correct alignment.

7. A system as set forth in claim 6 in which the film strip is composed of successive areas with the lines in each individual area of the film strip parallel to each other but inclined to the lines of adjacent areas by an angle not more than twice the width divided by the length of each line, and said predetermined signal is an alternating current signal that remains uniform during said continuous movement of the film strip.

8. A system as set forth in claim 4 in which the opaue and transparent strips forming the gratings are inclined with respect to the strips of adjacent gratings by angle not more than twice the width divided by the length of each strip.

References Cited

UNITED STATES PATENTS

| 3,054,902 | 9/1962 | Timms et al. | |
| 3,090,869 | 5/1963 | Astheimer | 250—203 |
| 3,098,186 | 7/1963 | Williamson et al. | |
| 3,166,624 | 1/1965 | Vargady. | |
| 3,244,063 | 4/1966 | Lawrence. | |
| 3,373,499 | 3/1968 | Rothe et al. | 33—226 |

RONALD L. WIBERT, Primary Examiner

J. ROTHENBERG, Assistant Examiner

U.S. Cl. X.R.

250—237